United States Patent
Signorini et al.

(10) Patent No.: US 12,549,390 B2
(45) Date of Patent: Feb. 10, 2026

(54) CONSENSUS FOR A BLOCKCHAIN VALIDATION

(71) Applicant: Nokia Technologies Oy, Espoo (FI)

(72) Inventors: Matteo Signorini, Palaiseau (FR); Matteo Pontecorvi, Palaiseau (FR)

(73) Assignee: Nokia Technologies Oy, Espoo (FI)

( * ) Notice: Subject to any disclaimer, the term of this patent is extended or adjusted under 35 U.S.C. 154(b) by 414 days.

(21) Appl. No.: 17/932,896

(22) Filed: Sep. 16, 2022

(65) Prior Publication Data

US 2023/0092547 A1 Mar. 23, 2023

(30) Foreign Application Priority Data

Sep. 23, 2021 (EP) ..................................... 21198597

(51) Int. Cl.
 *H04L 9/00* (2022.01)
(52) U.S. Cl.
 CPC ....................................... *H04L 9/50* (2022.05)
(58) Field of Classification Search
 CPC .......................................................... H04L 9/50
 See application file for complete search history.

(56) References Cited

U.S. PATENT DOCUMENTS

| | | | |
|---|---|---|---|
| 10,593,109 B1 | 3/2020 | Floyd | |
| 10,616,324 B1 * | 4/2020 | Kaddoura | H04L 69/329 |
| 10,986,184 B1 * | 4/2021 | Seymour | H04L 65/80 |
| 11,336,011 B2 * | 5/2022 | Tran | H04W 4/40 |
| 11,736,299 B2 * | 8/2023 | Cerna, Jr. | H04L 9/3239 |
| 2017/0243177 A1 * | 8/2017 | Johnsrud | G06Q 20/10 |
| 2018/0270244 A1 | 9/2018 | Kumar et al. | |
| 2019/0141048 A1 * | 5/2019 | Fallah | H04L 9/0643 |
| 2019/0163896 A1 * | 5/2019 | Balaraman | G06F 21/41 |
| 2019/0208422 A1 * | 7/2019 | Haleem | H04W 12/102 |
| 2019/0319780 A1 * | 10/2019 | Teo | H04L 9/0819 |
| 2020/0133254 A1 | 4/2020 | Cella et al. | |
| 2020/0134216 A1 | 4/2020 | R et al. | |
| 2020/0150994 A1 * | 5/2020 | Thompson | H04L 9/0643 |
| 2021/0099312 A1 * | 4/2021 | Guo | G06F 16/1837 |
| 2021/0135857 A1 * | 5/2021 | Parvataneni | H04L 67/104 |
| 2021/0217317 A1 * | 7/2021 | Ali | H04L 9/3239 |

FOREIGN PATENT DOCUMENTS

WO 2018/207012 A1 11/2018

OTHER PUBLICATIONS

Notice of Allowance received for corresponding European Patent Application No. 21198597.3, dated Nov. 9, 2023, 7 pages.

(Continued)

*Primary Examiner* — Bassam A Noaman
(74) *Attorney, Agent, or Firm* — Laine IP Oy

(57) ABSTRACT

There is provided a process for a blockchain, BC, consensus verification, comprising steps of receiving a transaction comprising sensor data on an event and a position data of a sender node of a blockchain network, selecting a number of nodes of the blockchain network as validating nodes based on their position data and the position data of the sender node, sending a new block to the blockchain network, wherein the new block is based on the received transaction, receiving labels assigned to the new block from the validating nodes, and verifying the received labels with a consensus protocol.

15 Claims, 3 Drawing Sheets

(56) References Cited

OTHER PUBLICATIONS

"Implementing PBFT in Blockchain", Medium, Retrieved on Sep. 23, 2022, Webpage available at : https://medium.com/coinmonks/implementing-pbft-in-blockchain-12368c6c9548.

Alladi et al., "Applications of Blockchain in Unmanned Aerial Vehicles: A Review", Vehicular Communications, vol. 23, Feb. 2020, pp. 1-28.

"IEEE 802.11", Wikipedia, Retrieved on Sep. 23, 2022, Webpage available at : https://en.wikipedia.org/wiki/IEEE_802.11.

Extended European Search Report received for corresponding European Patent Application No. 21198597.3, dated Mar. 17, 2022, 6 pages.

Datta et al., "BESDDFFS: Blockchain and EdgeDrone based secured data delivery for forest fire surveillance", Peer-to-Peer Networking and Applications, vol. 14, Jul. 9, 2021, pp. 3688-3717.

Castelló Ferrer, "The blockchain: a new framework for robotic swarm systems", arXiv, Jun. 25, 2017, 12 pages.

\* cited by examiner

CONSENSUS FOR A BLOCKCHAIN VALIDATION

FIELD

Various example embodiments relate to a consensus for a blockchain validation and a method, an apparatus, a computer program and a computer program product configured to provide such.

BACKGROUND

With the fast increase of automatization and intelligent network of systems, production environments enable facilities, machines and logistics chains to be autonomously managed. Upcoming generations of mobile communication systems, such as Fifth Generation (5G) communication systems, are expected to support applications such as virtual reality, augmented reality, reliable remote operation of machines, factory automation, network-assisted control of traffic, internet of things (IoT) and flexible systems enabling self-adaption, self-optimization and learning. Further requirements for future communication systems are caused by the increasing internetworking of physical devices such as appliances, vehicles, buildings, factories, machines, production systems, and other items and networks of such. The devices may be embedded with electronics, software, sensors, actuators, and network connectivity that enable the devices to collect and exchange data. Complexity of systems and management is increased.

SUMMARY

Some aspects of the invention are defined by the features of the independent claims. Some example embodiments are defined in the dependent claims.

According to a first aspect, there is provided a method, comprising receiving a transaction comprising sensor data on an event and a position data of a sender node of the BC network; selecting a number of nodes of the BC network as validating nodes, VDRs, based on their position data and the position data of the sender node; sending a new block to the BC network, wherein the new block is based on the received transaction; receiving labels assigned to the new block from the VDRs; and verifying the received labels with a used consensus protocol.

According to a second aspect, there is provided an apparatus, comprising means for performing the method of the first aspect or any embodiment thereof.

There is provided an apparatus comprising at least one processor, at least one memory including computer program code, the at least one memory and the computer program code being configured to, with the at least one processor, cause the apparatus at least to carry out features in accordance with the first aspect or any embodiment thereof.

According to still further aspects, there are provided a computer program and a computer-readable medium, or a non-transitory computer-readable medium, configured, when executed in a data processing apparatus, to carry out features in accordance with the first aspect or any embodiment thereof.

BRIEF DESCRIPTION OF THE DRAWINGS

Some example embodiments will now be described with reference to the accompanying drawings.

The scope of protection sought for various embodiments of the invention is set out by the independent claims. The embodiments, examples, drawings and features, if any, described in the specification that do not fall under the scope of the independent claims are to be interpreted as examples useful for understanding various embodiments of the invention.

EMBODIMENTS

There is provided a blockchain (BC) transactions validation process. The BC transactions validation process uses geographical and contextual information for validating transactions, instead of any kind of pre-loaded certificate on a ledger. The BC transactions validation process may be implemented with unmanned aerial vehicles (UAVs), like drones.

Figure 1:
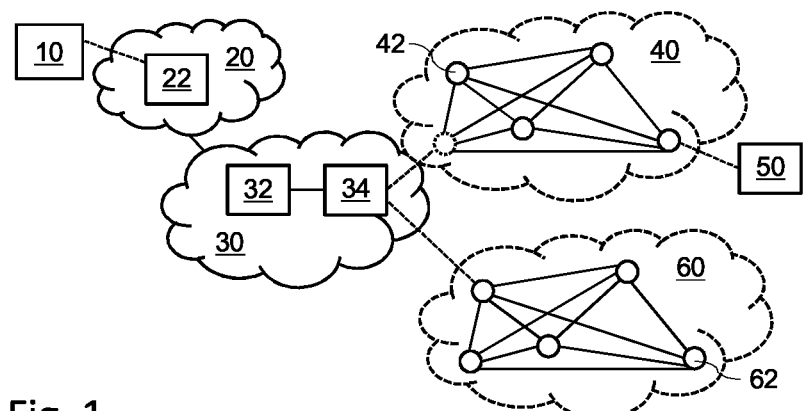
FIG. 1 illustrates an example communications system.

FIG. 1 illustrates a simplified example of a mobile communications system. The system comprises a mobile device (MD) 10, such as a user equipment (UE). Without limiting to Third Generation Partnership Project (3GPP) User Equipment, the term user equipment/UE is to be understood broadly to cover various mobile/wireless terminal devices, mobile stations and devices for user communication and/or machine type or IoT communication. In some embodiments, the MD 10 is a constrained UE device, lacking some capabilities over a conventional or fully-equipped UE.

The system comprises a mobile network, which may comprise an access network (AN) 20 and a core network 30. The AN 20 may be a cellular or public land mobile network (PLMN) based access network, such as a 3GPP 5G (or another generation) (radio) access network. The mobile device 10 may be configured to access a network node 22, such as a NodeB, evolved NodeB (eNB), Next Generation (NG) NodeB (gNB), a base station, an access point, or other suitable wireless/radio access network device or system. The access network (and the node 22 thereof) is connected to further node(s) of the network 30, such as a Next Generation core network, Evolved Packet Core (EPC), or another type of core network/network management element.

The MD 10 may be configured to connect a non-public network (NPN). The NPN may comprise a cellular or non-cellular (NPN) access network with access network node(s), such as an access point (AP) of an IEEE 802.11 based network or other non-3GPP access network, without however limiting to these examples. In an embodiment, the access network 20 is a NPN access network, which may be a private company network, for example. The NPN may comprise an NPN core network, which may comprise a set of appropriate core network functions. The NPN may be a standalone NPN (SNPN), i.e. operated by an NPN operator and not relying on network functions provided by a public land mobile network (PLMN), or a public network integrated NPN, i.e. a non-public network deployed with the support of a PLMN. Public network integrated NPNs can be enabled using network slicing.

The core network 30 may comprise various network functions (NFs) 32, 34. A network function in the present application may refer to an operational and/or physical entity, without limiting to 5G network functions. The network function may be a specific network node or element, or a specific function or set of functions carried out by one or more entities, such as virtual network elements or physical network nodes. Examples of such network functions include an access control or management function, mobility management or control function, session management or control function, interworking, data management or storage function, authentication function, data storage function, or a combination of one or more of these functions. In an embodiment, the NF 34 may be configured to manage mobile network data storage on the basis of mobile network data from another NF 32.

In some embodiments, the core network 30 is based on 3GPP 5G core network functions, some of which are illustrated below. In the 5G core network, user plane (UP) functions are separated from control plane (CP) functions. Access and Mobility Management Function (AMF) and Session Management Function (SMF) provide CP functions. The SMF controls one or more User Plane Functions (UPF) for handling user plane path of packet data unit (PDU) sessions for the UE. The AMF may comprise termination of radio access network CP N2 interface, registration management, connection management, reachability management, mobility management, access authentication, access authorization, Security Anchor Functionality (SEAF), Security Context Management (SCM), and support of N2 interface for non-3GPP access. Unified Data Management (UDM) is a network function storing subscriber and authentication data for the subscriber (represented by Universal Subscriber Identity Module, USIM) and may comprise support for generation of 3GPP authentication credentials, user identification handling, access authorization based on subscription data (e.g. roaming restrictions), serving network function registration, subscription management, without limiting to these functionalities.

The 5G Core advocates stateless architecture and proposes the storage of structured data in Unified Data Repository (UDR) and the unstructured data in the Unstructured Data Storage Function (UDSF). Various network functions can store and retrieve data into/from the UDSF and the UDR as necessary over the Nudsf and Nudrs interface, respectively. Structured data may refer to data for which the structure is defined in an associated (standard) specification, such as an appropriate 3GPP specification. Unstructured data may refer to data for which the structure is not defined in such specification.

With the introduction of 5G, more machine type communications or IoT devices connect to the mobile network. Additionally, unlike classical service provider networks, not all networks are public, but there may be various types of private enterprise networks providing services for mobile users.

As further illustrated in FIG. 1, a blockchain (BC) based platform or network 40 may be established by a set of nodes 42. The BC network may refer to a set of nodes maintaining a BC, wherein the nodes may store a local blockchain database. The BC network 40 and the BC may be a private, permissioned BC, in which access may be restricted for nodes authorized by network owner and managed by a certification authority (CA). Certain nodes of the network 40 may be authorized to operate as validators for BC transactions. The BC network 40 may be implemented by network nodes of one or more mobile networks, such as nodes of the CN 30. For example, a network node configured to implement the network function 34, is configured to operate as a BC node and part of the BC network 40. In another embodiment, the network function 34 is connected to a network node configured to operate as a BC node.

There may be BC nodes implemented or connected by network nodes 50 of other (mobile and/or non-mobile) networks. FIG. 1 also illustrates another (second) distributed system or blockchain network 60 comprising a set of nodes 62 maintaining another (second) BC. It is to be noted that a wide variety of mobile or non-mobile devices may be configured to operate as a BC node 42, 62, such as a network node or element, a server, a wireless device, a user device, a machine-type communications (MTC) device, or other type of computing device.

Blockchain is generally a decentralized and distributed ledger technology that uses algorithms and strong encryption to record digital transactions or data in a transparent, secure, and anonymous way. Application of blockchain technology enables a way to track the unique history of transactions by individual nodes in the network. Blockchain transactions secured by strong cryptography are exchanged and validated in order to reach consensus for resource ownership. There are several blockchain transaction validation processes, which are based on solving mathematical equations. For example blockchain based crypto currencies may simply check whether the amount of coins proposed to be spent within a transaction is owned by the payer. The amount owned by the payer corresponds to a certificate preloaded on the blockchain ledger. Since any node within the blockchain network is able to validate pending transaction, a simple approach is valued. However, in case a verifiable system a priori cannot be established, the validity of a proposed transaction remains unexplored. Such approaches based on mathematical conditions, preloaded to the blockchain ledger, may prevent application of blockchain technologies to general purpose scenarios without a prestored mathematical certificate.

There is presented a way to vouch for honesty and integrity of the proposed transaction, which does not require any preloaded certificate. This enables untilization of blockchain technologies in variety of general scenarios applications and implementations.

There is provided a blockchain network wherein unmanned aerial vehicles (UAV) are configured to operate as BC nodes. At least some or most or all of the BC nodes may comprise a drone. UAVs have both mechanical and electrical components.

Figure 2:
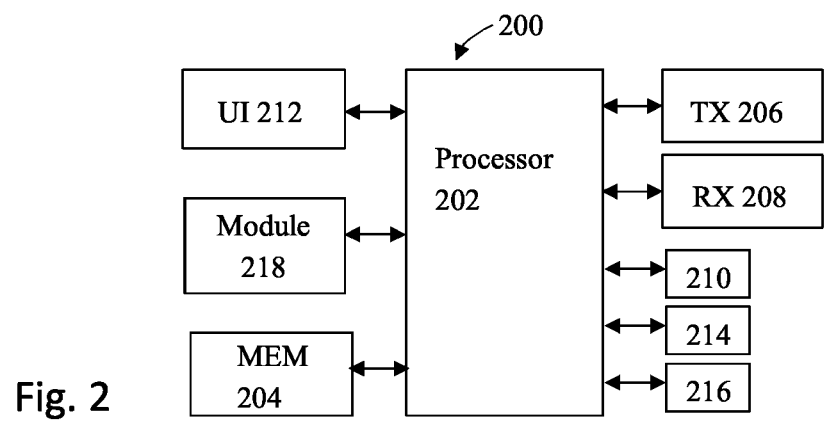
FIG. 2 illustrates an apparatus in accordance with and capable of supporting at least some embodiments.

FIG. 2 illustrates an apparatus in accordance with and capable of supporting at least some embodiments. The apparatus may comprise both mechanical and electrical components. The apparatus may be a device comprising electronic circuitries for realizing at least some embodiments. The apparatus may be or may be comprised in a mobile device MD, an unmanned aerial vehicle UAV, or any other type of apparatus provided with appropriate communication and processing capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

As used in this application, the term "circuitry" may refer to one or more or all of the following:
  (a) hardware-only circuit implementations (such as implementations in only analog and/or digital circuitry) and (b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

FIG. 2 illustrates an example apparatus capable of supporting at least some embodiments. Illustrated is a device 200, which may include one or more controllers configured to perform operations in accordance with at least some of the embodiments. Comprised in the device 200 is a processor 202, which may comprise, for example, a single- or multi-core processor wherein a single-core processor comprises one processing core and a multi-core processor comprises more than one processing core. The processor 202 may comprise more than one processor unit. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 200 may comprise memory 204. The memory may comprise random-access memory and/or permanent memory. The memory may comprise at least one RAM chip. The memory may comprise solid-state, magnetic, optical and/or holographic memory, for example. The memory may be at least in part comprised in the processor 202. The memory 204 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 200 but accessible to the device. For example, input parameters and control parameters affecting operations related to blockchain operations may be stored in one or more portions of the memory and used to control operation of the apparatus.

The device 200 may comprise a transmitter TX 206. The device may comprise a receiver RX 208. The transmitter and the receiver may be configured to transmit and receive, respectively, information in accordance with at least one cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 3GPP new radio access technology (N-RAT), IS-95, wireless local area network, WLAN, and/or Ethernet standards, for example. The device 200 may comprise a further transceiver 210, such as near-field communication, NFC, transceiver.

The device 200 may comprise user interface UI 212. The UI may comprise at least one of a display, a keyboard, a touchscreen, a speaker and a microphone. A user may be able to operate the device via the UI, for example to view and manage data, such as the mobile network data, stored in the memory 204 or on another device accessible via the transmitter 206 and the receiver 208, detect a state, an alarm or another condition of the device or connected system, and/or to configure parameters and/or features of the device.

The device 200 may comprise or be arranged to receive a removable (memory) module 214. The module may comprise, for example, a removable memory module or a cryptographic module installable in the device 200. For example, the module 214 may comprise cryptographic information for authentication and/or encryption of communicated information.

The processor 202 may be furnished with a transmitter arranged to output information from the processor, via electrical leads internal to the device 200, to other devices comprised in the device. Such a transmitter may comprise a serial bus transmitter arranged to, for example, output information via at least one electrical lead to memory 204 for storage therein. Alternatively to a serial bus, the transmitter may comprise a parallel bus transmitter. Likewise the processor may comprise a receiver arranged to receive information in the processor, via electrical leads internal to the device 200, from other devices comprised in the device 200. Such a receiver may comprise a serial bus receiver arranged to, for example, receive information via at least one electrical lead from the receiver 208 for processing in the processor. Alternatively to a serial bus, the receiver may comprise a parallel bus receiver.

The device 200 may comprise a module 218 configured to establish a position data of the device 200. The module 210 may be a global positioning system GPS module. The device 200 may comprise a camera 216. The camera 216 may enable capturing 2D images, 3D images and/or video images. The device 200 may comprise further devices not illustrated in FIG. 2. For example, some devices may include a further transceiver, a display/UI, and/or an identity module. In some embodiments, the device lacks at least one device described above. In addition, the device 200 may comprise one or more sensors for environmental sensing. Alternatively or in addition to the camera 216, the device may comprise at least one or more of: a temperature sensor, a thermometer, a gas detector, a gas sensor, a water sensor, a humidity sensor, a hygrometer, a pollution sensor, an ambient air quality monitor, an air pollution sensor, an image sensor, a sound detection sensor and a microphone.

The processor 202, the memory 204, the transmitter 206, the receiver 208, the module 212, as well as other modules, and/or the memory 214 may be interconnected by electrical leads internal to the device 200 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

The device 200 may comprise an UAV. The UAV may be able to take off and land vertically, and hover over a particular location. Some UAVs are capable of travelling via gliding in the atmosphere. UAVs may incorporate blockchain based communication in order to ensure integrity and trust among mutually dependent UAVs, which form peers or nodes of the blockchain. Blockchains may be modelled as peer-to-peer networks, via which peers distribute, forward and authenticate blockchain transactions. UAVs of the BC are peers and one of UAVs is designated as a leader. Once a transaction is created by any of UAVs, it may be broadcasted to the neighboring nodes for verification based on pre-defined specifications. Once the transaction is validated, it is sent to the other nodes. If a transaction is rejected, it is disrecarded. Only valid transactions are allowed to be recorded at each node. According to a principle of the blockchain network, a consensus is to be reached among the nodes of the blockchain. This enables decentralization. There are several consensus mechanisms and protocols, like Proof of Work, PoW, Delegated Proof of Stake, DPoS, Proof of Bandwidth, PoB, and Practical Byzantine Fault Tolerance, PBFT. The PBFT is a deterministic protocol, where peers are authenticated in the blockchain network before taking part to consensus. When implemented in an asynchronous network, PBFT requires 3f+1 nodes in order to tolerate up to f faulty nodes. For a synchronous network, PBFT requires 2f+1 nodes in order to tolerate up to f faulty nodes. Other protocols or technologies, alternative to the PBFT may comprise: a modular BC framework, like Hyperledger Fabric; a BC based platform, like NEO or NEO delegated Byzantine Fault Tolerance, NEO DBFT; an open network using a consensus algorithm based on Federated Byzantine Agreement, FBA, called Stellar or the "Stellar Consensus Protocol", SCP; a BC based digital payment network and protocol, utilizing a distributed consensus ledger, like Ripple; or a BC infrastructure for the decentralized web, like Parity.

It is provided a system for BC application and transaction validation. Data produced by a single UAV is validated with aid of sensed data on an event and geolocation of the UAV. Set of UAVs are selected based on their geolocation and proximity with the UAV to validate the sensed data captured by the single UAV. The selected UAVs reorganize in order to sense the corresponding data/area of the event. In response to positive validation, the transaction is stored to the BC. Validation of data produced by a single node via data sensed on an event and geolocation enables transaction validation without preloaded mathematical certificates and without compromising integrity and honesty of data. The event may relate to a suspected malfunction, a malfunction, an error or a disorder of a part or a function, abnormal values, deviations of sensed values, deviations from predetermined limits or thresholds, for example.

Figure 3A:
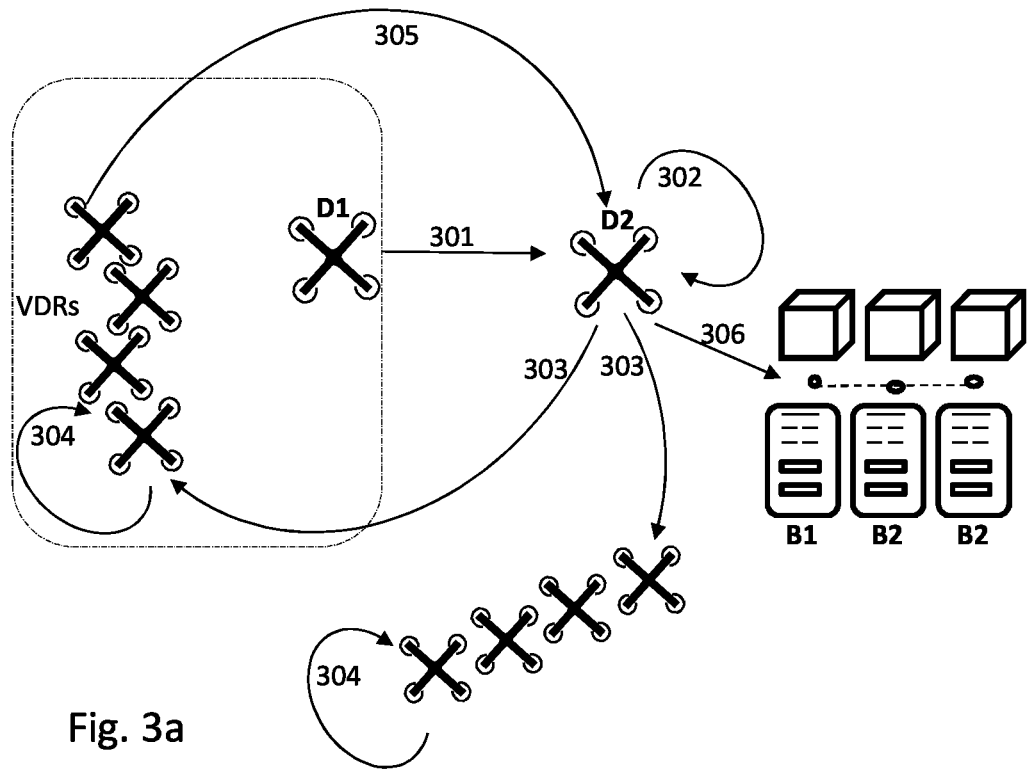
FIG. 3a illustrates a system in accordance with at least some example embodiments.

FIG. 3a illustrates a system in accordance with at least some example embodiments. UAVs form nodes of a blockchain network. The UAVs of FIG. 3a may be placed at a smart factory and arranged to serve a specific place or area. The UAVs may be positioned to monitor desired functions, processes, lines, phases, components, devices or robots of the smart factory, for example. The UAVs share a placement map including an identifier, such as public internet protocol IP address, and a specific position of the UAVs. The UAVs share maximum number of faulty nodes f that are tolerated, while still achieving a consensus among the nodes in the BC network. The maximum number of faulty nodes f, as well as selection of a leader or a ledger of the BC, are realized in accordance to the employed BC technology. The value f is determined and communicated to the UAVs. The maximum number of fake alarms at each time is f, since each UAV is able to raise at least one alarm at a time. An alarm is raised in response to a detected event by an UAV, as discussed in the following.

Any UAV is able to create and request a transaction in response to detecting an event. In FIG. 3a the UAV D1, which is configured to monitor a robot of a smart factory, detects an event, for example malfunctioning of a robot. D1 is configured to sense data, for example capture an image, of the event, for example of the suspected malfunction. D1 is configured to create a transaction including the public key of D1, the position of D1 and the sensed data. D1 is configured to broadcast 301 the transaction to other UAVs of the BC network.

A current BC leader D2 is configured to receive all the transactions broadcasted 301 in the BC network. D2 is configured to decide an order of the received transactions, and after that to pack the transactions within a BC block. D2 is configured to select 302 for each received transaction the nodes or UAVs, which shall verify the received transaction in question. The selected nodes are called validating drones, VDRs. The corresponding VRD lists are stored within the BC block. An algorithm may be used to select the VDR list, which matches the number f. The algorithm may be arranged to select number of VDRs in accordance to f so that number nodes in the VDR list is at least 3f+1. In addition the algorithm may selected nodes to the VDR list based on their proximity to the D1, being the sender of the transaction request.

D2, as the current BC leader UAV, is configured to start a consensus protocol. D2 is configured to broadcast 303 the new block to the BC network. If PBFT protocol is used, the new block is broadcasted 303 in a pre-prepare message. Each node or UAV that has received the new block is configured to validate 304 the VDR list. After the new block is received, the node is configured to investigate, whether it is included in the VDR list of the received new block. In case the receiver node is not in the VDR list, the received new block is discarded. In case the receiver node is in the VDR list, the receiver node VDR is configured to send back an acknowledgement to the leader D2, in order to acknowledge readiness to start the consensus protocol. In PBFT protocol this is done via a prepare message.

All VDR nodes are arranged to move close to D1 and to capture the same type or sort of data as D1, for example image data, of the event detected by D1. Data is captured or sensed by a sensor. The sensor may monitor environmental conditions, and detect temperature, gas, water, humidity, pollution, audio and/or image data, or changes of such, for example. Temperature and changes of temperature may be detected by a thermometer. Temperature and humidity may be detected using a hygrometer or separate temperature and humidity sensors. Existence of water, gas, particles or particulates may be detected by utilizing corresponding sensors. An image sensor or a camera may be utilized for capturing images or video. Sound may be detected via microphone. One sensor may trigger use of another sensor. For example, a thermometer sensing a temperature value deviating from a predetermined threshold value may trigger utilization of a humidity and/or a gas sensor. Use of more than one sensor type may enable complementing and confirming data sensed by the one sensor type. In order to enable comparison, VDR nodes use same type of sensors for capturing the same sort of data as D1.

The VRD nodes are configured to compare the captured data with the data received via the new block. The new block is received from the leader D2. The new block includes the data of the original transaction, as initiated by D1. In case the compared data is found to match, the event is confirmed by the VDR and a label TRUE is assigned to the transaction. Otherwise a label FALSE is assigned to the transaction. The assigned label is sent by the VDRs to the leader D2. The number of TRUE and FALSE labels are verified with a used consensus protocol. If PBFT protocol is used, for a synchronous communication protocol consensus is reached among 2f+1 number of TRUE labels; and for asynchronous communication protocol consensus is reached with 3f+1 number of TRUE labels. So, in case 2f+1, or for asynchronous communication protocol 3f+1, VDRs returned TRUE label, then the event is confirmed. The new block is stored 306 to the blockchain, if the event is confirmed. In response to the confirmed event, an alarm thereto may be created and/or information forwarded in order to inspect the event. The event may be a malfunction, a disorder, an unusual sensor data or values exceeding limits, for example. The forwarded information or the alarm may initiate corrective action for the malfunction or a malfunctioning part.

In case number of TRUE labels, or VDRs sending such, is less than determined for verification according to the used consensus protocol, the event is not confirmed and an initially proposed alarm is discarded. The verified new block is saved to the blockchain. UAV Blockchain architecture comprises a data layer containing timestamped blocks B1, B2, B3, or blocks of data, which comprise a block body and a block header. A header of the current block B2 contains a hash of the previous block B1, and a header of the next block B3 contains a hash of the current block B2. The blocks B1, B2, B3 are chained together like a linked list. The block body comprises hashes and transactions of the block.

UAVs enable mobile monitoring with aid of BC. BC consensus protocols are suitable for example for smart factory or industry 4.0 monitoring and auditing. For example, a robotic arm may be monitored according to embodiments. Any unexpected or weird movements of the robotic arm may be detected in accordance of embodiments. This enables detecting events, like abnormalities or malfunctions, at early phase and avoiding continuing or proceeding of such. Smart factory robots may be mobile and move freely. While mobile monitoring device is able to detect different angles of the monitored object, it may be the only suitable monitoring device for a moving object. The embodiments enable using mobile monitor devices, like drones, to monitor most or each components of a smart factory from most or each view-points. In accordance to embodiments, the decision of the mobile monitor devices are validated via BC technology. The validation takes into account positions of the mobile monitor devices.

An event may be detected by a sensor. An environmental sensing may be based on sensing temperature, gas, water, humidity, pollution, image, video, audio or alike data. Detection of an event may be based on the sensed data deviating from a normal state for a predetermined amount or more than predetermined thresholds, for example. Detection of an event may be based on detected data change in function of time. When image data is used, image recognition applications may be utilized. One or more type of data may be sensed and broadcasted as part of a transaction. For example, a hygrometer senses both temperature and humidity, or an image data may be accompanied with temperature data and/or audio data, for example. The VDRs are arranged to reorganize in order to sense the same source of the detected event. The VDRs are arranged to get closer, in proximity to the sender of the initial transaction of the detected event. Reorganizing of the VDRs may be based on their initial places in relation to the sender. After reorganized, the VDRs sense the same source of the event with the same kind of sensor data as initially sensed by the sender. The data sensed by a VDR may be compared with the data received by the VDR, since the same quantity is sensed and received.

Figure 3B:
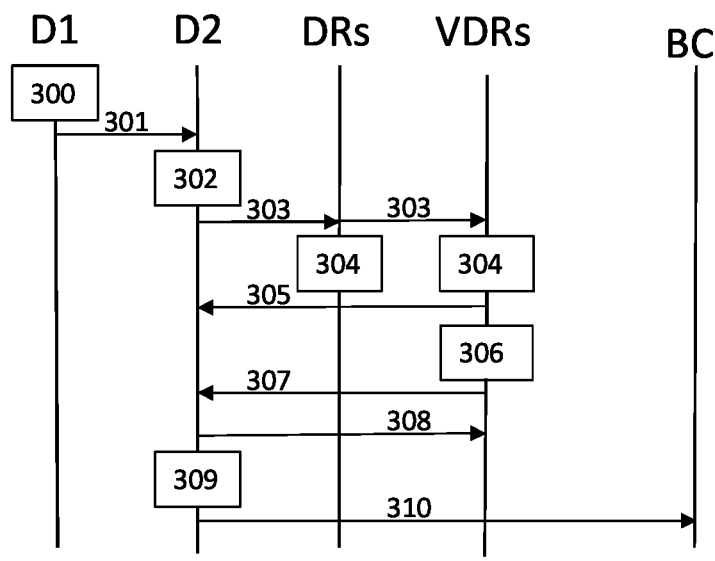
FIG. 3b illustrates signalling in accordance with at least some example embodiments.

FIG. 3b illustrates signalling in accordance with at least some example embodiments. Blockchain may store position data of the UAVs of the BC network in its database. UAVs may serve at a stationary point or serve a set or coordinates, at a particular allocated area. The signalling chart comprises UAVs as a nodes of a BC network. D1 is an UAV in the BC, D2 is a leader UAV in the BC, DRs illustrate UAVs in the BC, VDRs illustrate selected validating drones and BC illustrates a blockchain. All UAVs of the BC have a placement map including their public IP addresses and the specific position of each UAV. All UAVs of the BC are informed of maximum number of UAVs (or nodes of the BC) tolerated to be byzantine.

At phase 300 D1 is configured to create a transaction in response to an event detection. The even may be based on a malfunction, an error, a disorder or any abnormal value or detection. D1 is configured to capture data of a source of the event. D1 is configured to create a transaction request including the public key of D1, position data of D1 and the captured image. D1 is configured to broadcast 301 the transaction request. The transaction request is broadcasted to the BC network. The transaction request is received by a leader of BC network D2.

D2 is configured to receive all transaction requests from any UAV of the BC network. The transaction request sent by D1 is received by D2 301. At phase 302 D2 is configured to decide the order for all received transactions and to pack the received transactions to the BC as a new block. D2 is configured to select for the received transaction validating drones VRDs, which are configured to verify the received transaction. The VDR list is saved within the block. Selection and number of selected VDRs is based on used BC technology. An algorithm may be used to select the VDR list. The algorithm may be arranged to select number of VDRs in accordance to f so that number nodes in the VDR list is 3f+1. The algorithm may selected nodes to the VDR list based on their proximity to the D1.

D2 is configured to start a consensus protocol. D2 is configured to broadcast 303 the new block to the BC network. If PBFT protocol is used, the new block is broadcasted 303 in a pre-prepare message. Each node or UAV that has received the new block, DRs and VDRs of FIG. 3b, is configured to validate 304 the VDR list. In case the receiver node is not in the VDR list, the received new block is discarded. In case the receiver node is in the VDR list, the receiver node VDR is configured to send back an acknowledgement 305 to the leader D2, in order to acknowledge readiness to start the consensus protocol. In PBFT protocol this is done via a prepare message.

At phase 306 all VDR nodes are arranged to reorganize. The VDR nodes are arranged to move from their current locations closer to D1 and capture data of the source of the event detected by D1. The data captured by VDRs is similar data as received by the VDR. The VDR nodes are configured to compare the captured data with the data received at the new block. In case the compared images are found to match, the event is confirmed and a label TRUE is assigned to the transaction. Otherwise a label FALSE is assigned to the transaction. The assigned label is sent by the VDRs to the leader D2 307. The list of transactions received by the leader D2 and the labels assigned to each of them are send back in broadcast to the VDRs 308. The number of TRUE and FALSE labels are verified with a used consensus protocol 309. If PBFT protocol is used, for a synchronous communication protocol consensus is reached among 2f+1 number of TRUE labels; and for asynchronous communication protocol consensus is reached among 3f+1 number of TRUE labels. So, in case 2f+1, or for asynchronous communication protocol 3f+1, VDRs returned TURE label, then the event is confirmed. If the event is confirmed, the new block is stored to the blockchain 310. In response to the confirmed event, an alarm thereto may be created and/or information forwarded in order to further inspect the source of event, like a malfunctioning part, and/or start corrective actions.

Transactions in a block, like order, number and size of the transactions, are dependent on the blockchain technology used. A block may contain single or multiple transactions. The leader or ledger at each round is selected based on the used blockchain technology. The UAVs or drones may have different capabilities and those may be equipped with different sensors. Those comprised in a VDR have at least common capabilities to sense data in order to be able to validate the sensed data. A block may comprise data on an event and position data of a sender of such, with or without additional information.

The highest layer of the blockchain architecture is an application layer, which may comprise applications in various fields, which may utilize the embodiments, like internet of things IoT, artificial intelligence AI, smart cities, smart grids, energy management, smart communities, smart factories, machine learning, surveillance, monitoring and industry 4.0. In addition, the embodiments may be utilized for wild-fires detection, traffic congestion monitoring, weather monitoring, among others and not limited thereto. Used sensors, sensed data and type of it may vary among applications.

For many applications a private blockchain is utilized, instead of a public one. This may enable secure communication between peers or nodes of the blockchain network. UAVs may communicate with each other through a common channel. They may uniquely sign the data using their private key and broadcast to the whole network. The blockchain enables utilizing distributed decision making. The decisions may be stored in the blockchain and downloaded by a new node joining to the blockchain network. A new node may download a ledger containing previous decision histories, and synchronize with nodes of the blockchain network. This enables fast and easy scaling of the blockchain network.

Figure 4:
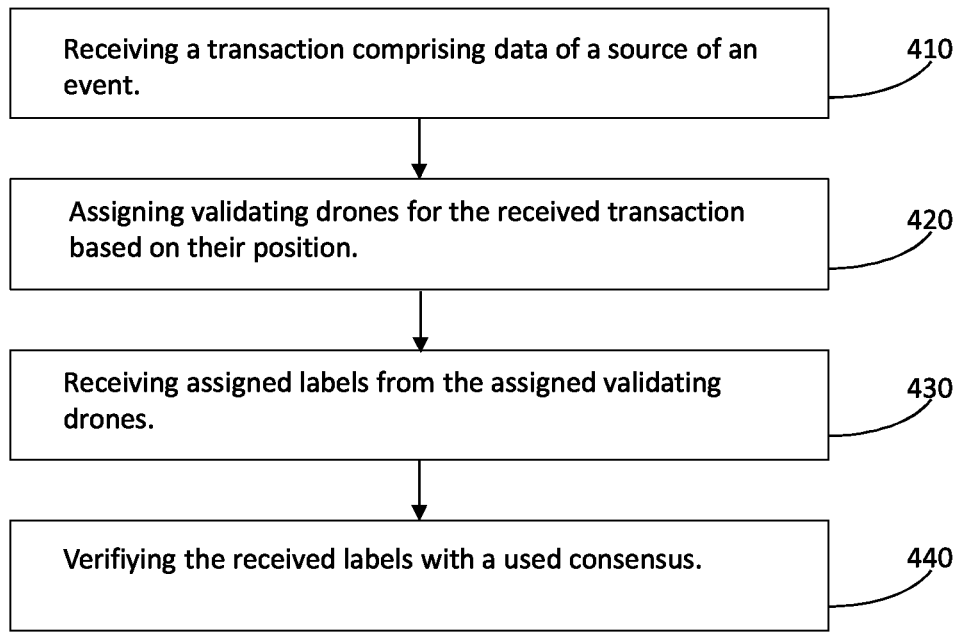
FIG. 4 illustrates a method in accordance with at least some example embodiments.

FIG. 4 illustrates a method in accordance with at least some example embodiments. The method may comprise detecting an event by a UAV of a BC network. In response, method may continue by capturing an image by the UAV and creating a transaction including the image, IP address of the UAV and position data of the UAV. The position data may be determined by coordinates, a positioning system, in view of a reference points, like a layout or a map, for example. The image data may be replaced by other sensor data captured from the source of the event. Here image data is used to describe sensor data.

The method of FIG. 4 comprises receiving the transaction comprising the image 410. The received transaction comprises the image captured of the detected event and position data of the sender UAV. The receiving entity is a current BC leader, which is receiving broadcasted requests and transactions in the BC. The method further comprises deciding an order of the received transactions. The method may further comprise packing the transaction within the BC block as a new block. Order, number and size of transactions, as well as selecting a leader are dependent on the used BC technology.

The method comprises selecting for each received transaction the validating drones 420, The validating drones, VDRs, are selected to verify the transaction. The method comprises storing VDR lists within the BC block. The method may comprise using an algorithm for selecting the VDR list. The selection of VDRs may comprise determining number of VDRs for the transaction. The number is determined based on number of tolerated byzantine UAVs, which has been communicated to the UAVs of the BC. The method may comprise selecting number of VDRs in accordance to f so that number of nodes in the VDR list is at least 3f+1 and selecting the determined number of nodes to the VDR list based on their proximity to the sender UAV, which detected the event, captured an image of it and sent the transaction. Position of UAVs of the BC is known. The method may comprise comparing, estimating, measuring or calculating the selected number of UAVs closest to the sender UAV.

The method may comprise broadcasting the new block to the BC network. The method may comprise broadcasting the new block in a pre-prepare message. The method may comprise receiving the new block and validating the VDR list. Validating the VDR list may comprise investigating whether the receiver UAV is included in the VDR list of the received transaction. In case the receiver node is not in the VDR list, the method at the receiver node ends by discarding the received new block. In case the receiver node is in the VDR list, the method at the receiver node continues by sending an acknowledgement to the leader. The acknowledgement is sent for acknowledging readiness to start the consensus protocol. The method may comprise sending acknowledgement via a prepare message.

The method comprises reorganizing by moving from the current position closer to the sender UAV, and to the source of the event, and capturing an image of the source of the event by VDRs. The method comprises comparing the captured image with the image of the received the new block. The method comprises assigning label TRUE to the transaction in case the compared images are found to match and otherwise assigning a label FALSE to the transaction. The method comprises sending the assigned label to the leader by each VDR.

The method comprises receiving the assigned labels from the VDRs 430. The method may comprise sending in broadcast the list of transactions and the labels assigned to each of them to all VDRs.

The method comprises verifying the number of TRUE and FALSE labels with a used consensus protocol 440. If PBFT protocol is used, for asynchronous communication protocol consensus is reached among 3f+1 number of TRUE labels. So, in case 3f+1 VDRs returned TURE label, then the method continues by confirming the event and storing the new block to the blockchain. In addition, the method may include creating an alarm and/or forwarding information in order to inspect the event.

Figure 5:
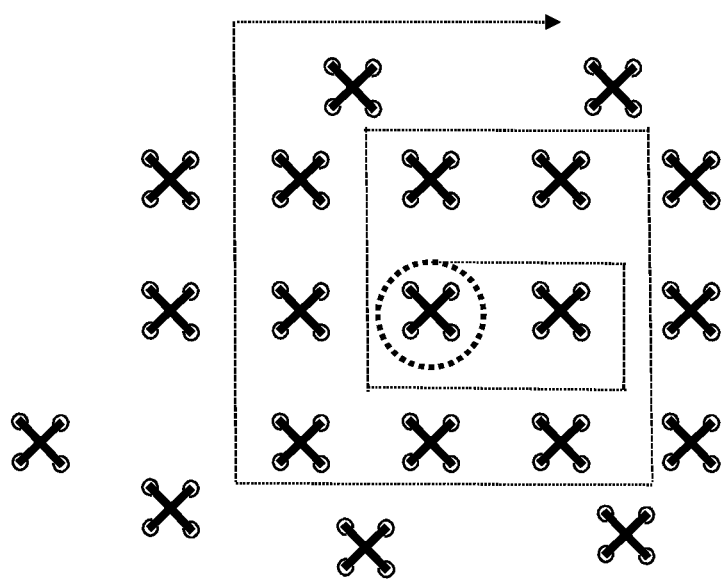
FIG. 5 illustrates an arrangement in accordance with at least some example embodiments.

FIG. 5 illustrates an arrangement in accordance with at least some example embodiments. UAVs are configured to form nodes of BC network and arranged in a desired order. Each UAV has a position, which is known by other UAVs of the BC network. The position may be a region which the UAV serves. UAVs may form a grid of serving areas. Depending on size of the area and object of surveillance, the UAV may be statically in their positions or configured to move regularly or constantly in their area. An arrangement and positions of UAVs may be based on factory layout and components and/or robots to be followed up. Internal spaces may have limited working space for UAVs. A location map of UAVs may be made with reference the layout or space. Positions may be specified with aid of coordinates or a location with reference to a static part of a factory, for example a static machine, a wall or a corner. In external or wide area implementations a positioning system may be used. For example each UAV may comprise a global positioning system GPS configured to provide position data of the UAV. Position of each UAV is known, so also position of each UAV with reference to the other UAVs of the BC is known. In addition, identifiers of UAVs of the BC are known. An identifier may comprise an IP address, a media access control, MAC, address, a certificate or other alike identifier. In addition, UAVs of the BC are aware of the selected number f, which is the number of tolerated byzantine UAVs in the BC. Any of the UAVs is able to initiate a transaction and request for verification. UAVs may include a camera for capturing an image on detected event. UAVs may be configured to monitor their area or defined component, for example. The camera may be utilized as a surveillance camera. Monitoring may utilize 2- or 3-dimensional images or video. Images or video may be analysed with aid of computized image processing, for example, object recognition techniques. In addition or alternatively, other sensors may be utilized for surveillance and/or monitoring. The UAV may be able to sense and detect change of temperature, humidity, environmental conditions, or alike. The UAV may comprise a sensor communicating with a counterpart placed to the monitored place or component. Various ways of monitoring and surveillance may be utilized in order to detect a deviation from expected, or so-called normal state. The detection of deviation may be based on detecting excess of a predetermined threshold illustrating a change.

FIG. 5 illustrates a circled UAV, which has detected an event and captured data of a source of the event in order to attach the captured data to a transaction for raising an alarm. After the transaction is received by a leader UAV of the BC, the leader UAV is configured to prepare a VDR list. This includes verifying determined number of UAVs in proximity with the circled UAV, being a sender of the transaction. The number of VDRs is based on used BC technology and may be determined based on maximum number of false/fail UAVs f, which are tolerated in the BC. With PBFT protocol, number of (3f+1) VDRs are selected in asynchronous communication network. In FIG. 5 the UAVs are positioned such that those form a grid of UAVs. The leader may know positions of other UAVs within the grid of UAVs, and trigger a grid-based selection based on the determined number of UAVs. The leader UAV may calculate the determined number of VDRs and select the determined number of VDRs based on their proximity in relation to the circled UAV of FIG. 5, being the sender of the transaction. Proximity may be based on known positions or areas, for example based on location map of the UAVs. In case UAVs have a certain area to monitor, they may update their positions at certain time intervals or in response to the broadcasted transaction, for example. In FIG. 5, the selection of the VDRs in proximity to the circled UAV is illustrated by a dotted line. In FIG. 5 the selection is made along enlarging area, as shown by the dotted line. The area of selection is enlarged to a first direction, in FIG. 5 to east/right from the circled UAV. After the on/more closest UAV(s) in the first direction is/are covered, the area of selection is enlarged to a second direction, in FIG. 5 up/north from the circled UAV. After the one/more closest UAV(s) in the second direction are covered, the area of selection is enlarged to a third direction, in FIG. 5 down/south from the circled UAV. After the one/more closest UAV(s) in the third direction are covered, the area of selection is enlarged to a fourth direction, in FIG. 5 left/west from the circled UAV. The first and following directions to which the area of selection is enlarged, may depend on the direction where the closest UAV among UAVs is positioned. The following direction may be selected based on directions, which have not been covered yet, via the previous directions of selection. Selection may be implemented taking into account coverage of various directions and angles of the source of the event by the VDRs. In case of constantly or regularly moving UAVs, it is possible to select VDRs based on UAV monitor area, or determine the UAV position at the time, for example based on position data and/or current camera data. Number of VDRs and selection of those may be based on the used BC technology. Algorithms may be utilized for selecting VDRs based on proximity with the sender of the transaction including data of the event.

After VDRs are selected, have received a new block and validated themselves as VDRs, the VDRs reorganize by moving from their current positions closer to the sender UAV that detected and sent data on the event. The VDRs have position data of UAVs in the BC. The VDRs may have updated position data of the VDRs. VDRs are able to select routes such that collisions are avoided. A fleet reorganization protocol maybe utilized. VDRs approach the sender UAV from their own direction and angle. Routes for reorganization and reorganized positions may be planned and broadcasted within BC. After the VDRs have been reorganized, the VDRs capture an image of the source of the event. The images of the object are captured from different angles and distances by the VDRs. Comparison of images is implemented by a VDR and based on the comparison a label TRUE or FALSE is assigned to the image. The comparison may be implemented by each of the VDRs. The labels are transmitted and collected by the leader. The leader may apply a consensus protocol in order to verify, whether there is found a consensus among the labels or not. In case amount of TRUE labels exceeds a determined value, 3f+1, there is found a consensus. If the consensus is found, the corresponding block is saved to the BC and alarm or other determined action is triggered.

A blockchain transaction may be a public or private transaction. A blockchain transaction record comprises the relevant transaction information, and a hash pointer to previous block of the chain. The record may comprise also further information element(s), such as a timestamp. Each block in the chain typically contains a hash pointer as a link to a previous block, a timestamp and transaction data.

Each block of data has a unique hash. The hash serves also as an address or link to the next block. This chain of blocks may be copied to all nodes of the network, thus forming a distributed blockchain.

The transactions are broadcasted into the blockchain network. Broadcasting here refers to a dissemination method suitable for the context, which will cause the transactions to be communicated to the nodes of the network in general. Reaching each and every node with each and every transaction is not in all implementations necessary. The VDRs are selected based on the used BC technology, for example number of (3f+1) VDRs. The selected VDRs are arranged to receive and respond to transactions.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one example embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. A system comprising: at least one processor; and at least one memory storing instructions that, when executed by the at least one processor, cause the system at least to perform:
receive a transaction comprising sensor data on an event and a position data of a sender node of a blockchain network,
select a number of nodes of the blockchain network as validating nodes based on their position data and the position data of the sender node,
send a new block to the blockchain network, wherein the new block is based on the received transaction,
receive labels assigned to the new block from the validating nodes,
verify the received labels with a consensus protocol,
receive the new block, at a node of the blockchain, and verify whether the node is one of the selected validating nodes for the received new block,
in case the node is one of the selected validating nodes, move the node towards the sender node and/or area of the event in order to capture data on the event,
compare the captured data and the received data on the event, and
assign a label to the transaction based on the comparison, and transmit the label to the leader.

2. The system of claim 1, wherein the number of the validating nodes is based on tolerated byzantine nodes of the blockchain network, optionally based on fault tolerance of used blockchain technology.

3. The system of claim 1, wherein the validating nodes are selected based on their proximity to the sender node.

4. The system of claim 3, wherein position data of the nodes of the blockchain network is stored in the blockchain.

5. The system of claim 1, wherein the sensor data comprises data of at least one of the following: a temperature sensor, a thermometer, a gas detector, a gas sensor, a water sensor, a humidity sensor, a hygrometer, an ambient air quality monitor, a pollution sensor, an air pollution sensor, an audio sensor, a microphone, a sound detection sensor, an image sensor or a camera.

6. The system of claim 1, wherein the received labels have been assigned to the new block by the validating nodes based on comparison of the detected data in the new block received by a validating node and the detected data on the event captured by the validating node.

7. The system of claim 1, wherein the received labels comprise data on the event captured by the validating nodes.

8. The system of claim 1, wherein verifying the received labels utilizes number of tolerated byzantine validating nodes in accordance to the used blockchain protocol.

9. The system of claim 1, wherein the at least one processor; and at least one memory storing instructions that, when executed by the at least one processor, further cause the apparatus at least to perform: confirm the event and store the new block to the blockchain in response to verifying the received labels reaching consensus.

10. The system of claim 1, wherein the at least one processor; and at least one memory storing instructions, when executed by the at least one processor, further cause the system: to detect an event, to capture an image and to create a transaction by the nodes of the blockchain network.

11. The system of claim 1, wherein the at least one processor; and at least one memory storing instructions, when executed by the at least one processor, further cause the system:
to create a transaction in response to detected event, wherein the created transaction comprises sensor data on the detected event and the position data of the sender node; and
to broadcast the created transaction to the blockchain network by the sender node.

12. A method for a blockchain consensus verification, comprising:
receiving a transaction comprising sensor data on an event and a position data of a sender node of a blockchain network,
selecting a number of nodes of the blockchain network as validating nodes based on their position data and the position data of the sender node,
sending a new block to the blockchain network, wherein the new block is based on the received transaction, receiving labels assigned to the new block from the validating nodes, verifying the received labels with a consensus protocol, receiving the new block, at a node of the blockchain, and verifying whether the node is one of the selected validating nodes for the received new block, in case the node is one of the selected validating nodes, moving the node towards the sender node and/or area of the event in order to capture data on the event, comparing the captured data and the received data on the event, and assigning a label to the transaction based on the comparison, and transmitting the label to the leader.

13. The method of claim 12, further comprising at the sender node creating a transaction in response to detecting an event, wherein the transaction comprises data on the event and the position data of the sender node, and broadcasting the transaction to the blockchain network by the sender node.

14. A non-transitory computer readable medium comprising program instructions that, when executed by a system, cause the system to perform at least the following:

receive a transaction comprising sensor data on an event and a position data of a sender node of a blockchain network, select a number of nodes of the blockchain network as validating nodes based on their position data and the position data of the sender node, send a new block to the blockchain network, wherein the new block is based on the received transaction, receive labels assigned to the new block from the validating nodes and verify the received labels with a consensus protocol, receive the new block, at a node of the blockchain, and verify whether the node is one of the selected validating nodes for the received new block, in case the node is one of the selected validating nodes, move the node towards the sender node and/or area of the event in order to capture data on the event, compare the captured data and the received data on the event, and assign a label to the transaction based on the comparison, and transmit the label to the leader.

15. A method of claim 12, comprising:

verifying that the received labels utilize a number of tolerated byzantine validating drones (VDRs) in accordance to the used consensus protocol; and confirming the event and storing the new block to the blockchain in response to verifying the received labels reaching consensus.

* * * * *